United States Patent [19]
Spencer

[11] Patent Number: 5,243,457
[45] Date of Patent: Sep. 7, 1993

[54] MATERIAL WITH ENHANCED VISIBILITY CHARACTERISTICS

[75] Inventor: Andrew B. Spencer, Manchester, Conn.

[73] Assignee: American Ingenuity, Inc., Bloomfield, Conn.

[21] Appl. No.: 890,392

[22] Filed: May 26, 1992

Related U.S. Application Data

[63] Continuation of Ser. No. 823,999, Jan. 27, 1992, abandoned, which is a continuation-in-part of Ser. No. 650,894, Feb. 5, 1991, abandoned.

[51] Int. Cl.$^5$ .................. G02B 5/124; F21K 2/00; H05B 33/02
[52] U.S. Cl. ................... 119/795; 250/484.2; 359/315
[58] Field of Search ............... 359/315, 318, 515, 529, 359/530, 834; 250/462.1, 466.1, 458.1, 459.1, 483.1, 484.1 R; 119/109

[56] References Cited

U.S. PATENT DOCUMENTS

| | | |
|---|---|---|
| 1,319,123 | 10/1919 | Simon . |
| 1,373,783 | 4/1921 | Willis . |
| 1,454,755 | 5/1973 | Matisse et al. . |
| 2,333,641 | 11/1943 | Corwin . |
| 2,910,792 | 11/1959 | Pfaff . |
| 3,012,164 | 12/1961 | Franzone et al. . |
| 3,260,846 | 7/1966 | Feuer . |
| 3,452,464 | 7/1969 | Robinson . |
| 3,583,298 | 6/1971 | Van Swearingen . |
| 3,584,216 | 6/1971 | Tinney . |
| 3,591,942 | 7/1971 | Van Swearingen . |
| 3,684,348 | 8/1972 | Rowland . |
| 3,698,295 | 10/1972 | Van Swearingen . |
| 3,757,730 | 9/1973 | Douglas . |
| 3,758,190 | 9/1973 | Douglas . |
| 3,766,881 | 10/1973 | Ward . |
| 3,810,804 | 5/1974 | Rowland ........................ 359/530 |
| 3,830,682 | 8/1974 | Rowland . |
| 3,869,346 | 9/1974 | Rowland . |

(List continued on next page.)

FOREIGN PATENT DOCUMENTS 76103063 2/1982 Taiwan .

OTHER PUBLICATIONS

Hanovia Technical Bulletin, "Spot-Lite" Glow-in-the-Dark Films, Series 4100 CLL and Series CLL, Technical Data Sheet #20, Nov. 1, 1988, 4 pages.
Product Bulletin, "Reflexite" Reflective Material, Reflexite Corporation, Nov. 1987, 2 pages.
Guide Specification, "Reflexite" Reflexite Material, Reflexite Corporation, May 1990, 1 page.

Primary Examiner—Paul M. Dzierzynski
Assistant Examiner—Richard Hanig
Attorney, Agent, or Firm—Perman & Green

[57] ABSTRACT

Flexible visibility enhancing material is provided which combines the advantages of a light reflective component and a luminescent component. The material includes a first layer of prismatic light reflective plastic material having an underlying surface formed with a plurality of minute prism-like formations projecting therefrom at regular spaced intervals and an overlying substantially smooth light transmissive surface. Bonded as by heat sealing to the first layer is a second layer of plastic luminescent material contiguously and integrally attached to the underlying surface of prism-like formations and generally coextensive therewith. The visibility enhancing material simultaneously radiates luminescent light from the second layer through the underlying surface of prism-like formations and through the smooth light transmissive surface and reflected light from the prism-like formations through the smooth light transmissive surface. In one embodiment, a leash for controlling and restraining a pet animal includes a flexible elongate member comprised of the visibility enhanced material. In another embodiment, the second layer is replaced with a layer of luminescent material which can be selectively energized to become luminous.

17 Claims, 2 Drawing Sheets

U.S. PATENT DOCUMENTS

| | | |
|---|---|---|
| 3,871,336 | 3/1975 | Bergman . |
| 3,935,359 | 1/1976 | Rowland . |
| 3,944,835 | 3/1976 | Vosburgh . |
| 3,952,690 | 4/1976 | Rizzo et al. .................. 359/529 |
| 3,975,083 | 8/1976 | Rowland . |
| 3,992,080 | 11/1976 | Rowland . |
| 4,016,665 | 4/1977 | Sakota . |
| 4,032,791 | 6/1977 | Chiola et al. . |
| 4,194,809 | 3/1980 | Campagna, Jr. . |
| 4,250,646 | 2/1981 | Trachtenberg . |
| 4,328,533 | 5/1982 | Paredes . |
| 4,349,598 | 9/1982 | White . |
| 4,377,750 | 3/1983 | Pape et al. . |
| 4,403,565 | 9/1983 | Bleiweiss et al. . |
| 4,440,104 | 4/1984 | Bleiweiss et al. . |
| 4,497,126 | 2/1985 | Dejean . |
| 4,555,161 | 11/1985 | Rowland . |
| 4,676,595 | 6/1987 | Danker . |
| 4,712,319 | 12/1987 | Goria . |
| 4,713,577 | 12/1987 | Gualtieri et al. . |
| 4,801,193 | 1/1989 | Martin . |
| 4,844,990 | 7/1989 | White . |
| 4,875,799 | 10/1989 | Harrison . |
| 4,922,585 | 5/1990 | Suzuki et al. . |
| 4,928,414 | 5/1990 | Bright . |
| 5,009,019 | 4/1991 | Erlendsson et al. . |

MATERIAL WITH ENHANCED VISIBILITY CHARACTERISTICS

BACKGROUND OF THE INVENTION

This is a continuation of application Ser. No. 823,999, filed Jan. 27, 1992, now abandoned which is a continuation-in-part of U.S. application Ser. No. 07/650,894 of Andrew B. Spencer et al filed Feb. 5, 1991 now abandoned and entitled "Visibility Enhancing Material".

FIELD OF THE INVENTION

The present invention relates to flexible visibility enhancing material which is simultaneously self radiating and capable of reflecting light from an outside source. In one embodiment, the material may be in sheet form comprising an overlying layer of prismatic light reflecting material and an underlying layer of luminescent material in which the latter can be selectively energized to become luminous.

Various reflective materials are commonly employed for safety and decorative purposes. One of the most common principles employed is simply to apply a reflective coating upon a surface of the item or to construct the item of a highly reflective material such as polished metal. In addition to reflective coatings and specular surfaces, it is also common to use structures which have upon one or both surfaces various formations which reflect the light rays impinging thereon, either principally as a result of the steepness of the angle at which the light ray impinges the surface or by virtue of reflective coatings on the surface of the formations.

There has been a constant demand for retroreflective materials, i.e. materials capable of reflecting the bulk of the light rays impinging thereon in a substantially parallel path back toward the source of the light. Minnesota Mining and Manufacturing Company has sold a material under the trademark SCOTCHLITE which relies upon minute glass spheres embedded in a matrix of synthetic resin to provide such retroreflection. Another type of retroreflective element has been a molded member having cube corner formations on one surface thereof, such molded members being formed from glass or synthetic plastic.

Cube corner reflectors molded from glass and more recently from acrylic resins have commonly been employed as safety devices on bicycles, automobiles and other vehicles. Although it had long been suggested that the cube corner might be of small dimension until the advent of the Rowland U.S. Pat. No. 3,684,348, generally such formations were of appreciable size. Furthermore, the nature of the material from which reflectors were fabricated resulted in structures which were relatively rigid in character and which did not lend themselves either to shaping to various substrates of nonplanar character or to use as a fabric which might be worn. Moreover, it came to be recognized that as the size of the cube corner formations is reduced, criticality in control of angles and dimensions becomes far more acute since even a minute deviation will produce a substantial deviation in the capability of the material to retroreflect light rays impinging thereon.

The Rowland patent represented a significant advancement in the field of reflective materials. That patent discloses a retroreflective composite synthetic plastic material comprised of a body portion having substantially smooth surfaces on opposite sides thereof and a large number of minute cube corner formations closely spaced about and projecting from one of the smooth surfaces. The cube corner formations each have three faces and a base adjacent the body portion with a side edge dimension said to be not more than 0.025 inch and preferably less than 0.010 inch and the close spacing avoids any substantial smooth areas therebetween. The body portion and the cube corner formations are separately formed from essentially transparent synthetic plastic resin and are bonded together into a composite structure wherein those light rays entering into the material through the opposite surface of the body portion predominately pass through the body portion and into the cube corner formations by which they are reflected back through the composite structure substantially parallel to the path of entry.

In the most conveniently formed structure of the patented concept, each cube corner formation has one face parallel to one face of every other cube corner formation. Preferably, the cube corner formations are substantially equal in size and arranged in a pattern of rows and columns. The center-to-center spacing between cube corner formations in every row and between cube corner formations in every column is in accordance with a uniform pattern to insure close spacing of the formations and good retroreflection. The apex of each cube corner formation is in alignment with the apices of all of the cube corner formations located in the pattern row and column in which it is disposed, and each apex is vertically aligned with the center of its base.

To provide optimum reflectivity, the composite material has a reflective coating deposited on the cube corner formations. An adhesive layer may then be provided on the reflective coating and a removable piece of sheet material loosely adhered to the adhesive layer. This self-adherent composite structure may be readily used since the sheet material may be removed to adhere the retroreflective sheet material to a substrate. In the optimum form, either with or without an adhesive coating, the reflective coating is metallic and the structure includes a layer of resin deposited on the metallic coating to provide protection therefor. In the absence of a protective resin layer, it is customary to provide an integral, non-removable backing sheet to provide protection for the cube corner formations which can be easily damaged. The backing sheet also serves to enhance the reflectability of the cube corner formations.

Over the years, there have also been significant advances in the use of luminous materials for compositions to provide visibility at nighttime or in locations in which little or no light is available or permissible. Throughout this disclosure, the expression "luminous material" or "luminous composition" is intended to include any material or composition which has phosphorescent, fluorescent, and/or auto luminescent properties. An early disclosure of a luminous device is provided in U.S. Pat. No. 1,373,783 to Willis which discloses a glass plate mounted in a metal holder with a layer of luminous powder compressed between the glass plate and the holder. In a further development disclosed in U.S. Pat. No. 2,333,641 to Corwin, luminous adhesive sheet or tape material is disclosed. In this instance, a sheet of cellulose film is provided with a permanently tacky, pressure-sensitive, adhesive coating containing a luminous material. The coating is applied to one surface of the sheet or tape and is visible through the sheet or tape when the latter is applied to a supporting object.

Still another disclosure of a luminous structure is provided in U.S. Pat. No. 3,260,846 to Feuer which discloses a light source utilizing the beta ray energy of a radioactive material characterized by having a front phosphor region of sufficient depth to absorb the emitted beta rays but not the light generated by the radioactive excitation of the phosphor particles. It includes a back heavy metal reflecting region which, due to the high atomic number, at least 45, serves to back scatter the beta particles as well as reflect light. The reflected beta particles then further excite the forward phosphor regions and ultimately this energy is discharged from the system in a form of light energy.

A more recent development is a phosphorescent type material produced and sold by Hanovia Division of Conrad Inc. of Newark, N.J. under the trademark "SPOT-LITE". In this instance, the luminescent material is of flexible vinyl plastic film which absorbs energy from any light source to which it is exposed, whether natural sunlight, or artificial incandescent or fluorescent light, and chemically generates a luminous light in response thereto. The film produces an intense bright green glow which is visible in absolute darkness for a duration of approximately thirty minutes. After that period of time, even though eighty to eighty-five percent of its luminosity will have diminished, it continues to exhibit a visible glow for up to an additional eight hour period of time. Nonetheless, after exposure of three to ten seconds of ambient light, the film can be recharged to its maximum capacity.

It was with knowledge of the foregoing and, particularly, with knowledge of the retroreflective material disclosed in Patent No. 3,684,348 and of the luminous film of the type sold under the trademark "SPOT-LITE" that the present invention was conceived and has been reduced to practice.

SUMMARY OF THE INVENTION

In accordance with the invention, flexible visibility enhancing material is provided which combines the advantages of a light reflective component and a luminescent component. The material includes a first layer of prismatic light reflective plastic material having an underlying surface formed with a plurality of minute prism-like formations projecting therefrom at regular spaced intervals and an overlying substantially smooth light transmissive surface. Bonded as by heat sealing to the first layer is a second layer of plastic luminescent material contiguously and integrally attached to the underlying surface of prism-like formations and generally coextensive therewith. The visibility enhancing material simultaneously radiates luminescent light from the second layer through the underlying surface of prism-like formations and through the smooth light transmissive surface and reflected light from the prism-like formations through the smooth light transmissive surface. In one embodiment, a leash for controlling and restraining a pet animal includes a flexible elongate member comprised of the visibility enhanced material and extends between proximal and distal ends. The leash is provided with a handle at the proximal end and an attachment member at the distal end for releasable connection to the pet animal.

The combination of the two vinyl layers creates a new material which has the characteristics of both. The retroreflective phosphorescent type material of the invention reflects light back in the direction of its source and also produces its own light in conditions of subdued light and total darkness. This unique combination enables the material of the invention to be visible when light is shined onto it, and also when the light source is extinguished entirely. Additionally, the visibility enhancing material of the invention is visible under extreme variations and lighting conditions, including total darkness.

This is an unexpected phenomenon since the construction of the retroreflective material disclosed in Patent No. 3,684,348 and marketed under the trademark "REFLEXITE" is not known to be transparent or translucent to any substantial extent. It is reflective of light shined onto it, but is not known for any characteristic which would enable transmission of light from a second source on a side opposite the source being reflected.

Indeed, there are variations of "REFLEXITE" material available to the public which are formed in distinctive grid patterns of fluorescent red-orange and fluorescent lime-yellow, so-called "shocking" colors. However, the fluorescence is not of the glow-in-the-dark variety.

Another unexpected phenomenon provided by the material of the invention is that the life expectancy of the radiance from the luminescent material has been found to be substantially extended. Apparently, the retroreflective material serves to protect the chemical content of the luminescent material such that the decay of its luminous glow is substantially reduced.

In another embodiment of the invention, the material may be in sheet form comprising a layer of prismatic light reflecting material and an underlying layer of luminescent material in which the latter can be selectively energized to become luminous.

It is an object, therefore, of the invention to provide a unitary visibility enhancing material which combines the advantages of a light reflective component and a luminescent component.

It is another object of the invention to provide such a unitary visibility enhancing material which is flexible and capable of mounting on and shaping to surfaces of various configurations, including walls, buildings, signs, clothing, vehicles, and the like.

Still another object of the invention is to provide such a visibility enhancing material having an adhesive coating by which it may be conveniently adhered to a support surface.

A further object of the invention is to provide such a material which is inexpensive and can be readily produced using known materials. Yet another object of the invention is to provide such a composite material in which the life expectancy of the radiance from the luminescent material is substantially prolonged.

A further object of the invention is to provide flexible visible enhancing material which may be in sheet form comprising a layer of prismatic light reflecting material and an underlying layer of luminescent material in which the letter can be selectively energized to become luminous.

Other and further features, advantages, and benefits of the invention will become apparent in the following description taken in conjunction with the following drawings. It is to be understood that the foregoing general description and the following detailed description are exemplary and explanatory, but are not to be restrictive to the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE ILLUSTRATED EMBODIMENTS

Figure 1:
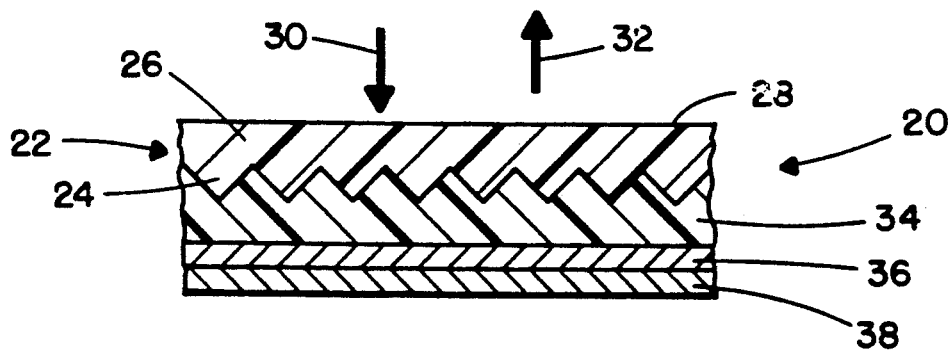
FIG. 1 is a fragmentary cross section view of flexible visibility enhancing material embodying the invention.

Turn now to the drawings and, initially, to FIG. 1 which illustrates, in section, flexible visibility enhancing material 20 embodying the invention. The material 20 is layered and may be of sheet or tape form. A first layer 22 of the material is comprised of prismatic light reflective material having an underlying surface formed with a plurality of minute prism-like formations 24 which project outwardly from a main body 26 at regular spaced intervals. The main body is also formed with an overlying substantially smooth light transmissive surface 28.

The first layer 22 may be substantially similar to the construction disclosed in U.S. Pat. No. 3,684,348, cited above, the disclosure of which is incorporated herein by reference in its entirety. As disclosed in that patent, the prism-like formations 24 are actually cube corner formations each of which has three planar faces which are disposed in planes perpendicular to each other and intersecting along their side edges. The apex of each such prism-like formation is vertically aligned with the center of the base. The formations 24 are arranged in a pattern providing rows and columns and the center-to-center spacing between the apices of the formations along the rows and columns is in accordance with a regular pattern to assure close spacing and avoid substantially any flat areas between them.

By reason of that configuration, a light ray 30 directed towards the surface 28, passes through the main body 26, then strikes one of the planar surfaces. The light ray is directed to a second of the planar surfaces, then to a third of the planar surfaces, after which it is directed out of the formation 24 in a return path indicated by a reflected light ray 32. The path of the reflected light ray 32 is substantially parallel to that of the light ray 30 before entering the main body 26. Indeed, this is the principle of retroreflection which is utilized by the material manufactured and sold by Reflexite Corporation of New Britain, Connecticut under the trademark "REFLEXITE".

As noted in Patent No. 3,684,348, a reflective coating overlying the prism-like formations 24 may be provided by a metallized synthetic plastic film which is brought into intimate contact with the surface of the cube corner formations. For purposes of the present invention, such a film is not used, however. In its place, a second layer 34 of luminescent material is applied to the prism-like formations 24 so as to be contiguously and integrally attached thereto and generally coextensive therewith. The second layer 34 is preferably of a vinyl material having luminescent qualities such as that mentioned above which is commercially available under the trademark "SPOT-LITE". The second layer 34 may be bonded to the formations 24 as by heat or ultrasonic sealing performed in such a manner that the quality of the prism-like formations is not compromised in any manner.

In one embodiment, a coating or layer 36 of a permanently tacky, pressure sensitive adhesive is deposited on the surface of the second layer 34 opposite the prism-like formations 24. Thereafter, a sheet of backing material 38, or release paper, is applied so as to overlie the adhesive 36 and is loosely adhered thereon. To mount this structure on a suitable surface, the sheet 38 is removed and the remaining composite material pressed thereagainst so that the adhesive coating will adhere thereto.

Supporting surfaces for the visibility enhancing material 20 of the invention are virtually limitless and, as noted above, may include walls, buildings, signs, clothing, vehicles, and a variety of other receiving surfaces. When so mounted, a surface 28 is an outermost surface and is first subjected to a primary light ray 30. Light rays 30 impinge upon the prism-like formations 24 and, with the aid of the second Layer 34 of luminescent material providing a reflective background, are redirected as reflected light rays 32. Simultaneously, in subdued light or under conditions of substantial darkness, the second layer 34 emits its luminescence through the prism-like formations 24 and through the first layer 22 and through the smooth light transmissive surface 28 to regions external of the material 20.

In use, it has been found that the material 20 of the invention is substantially as reflective as the unmodified REFLEXITE material, or equivalent, which is utilized in its construction. At the same time, the luminescence emitted by the material 20 of the invention is substantially the same as the unmodified "SPOT-LITE" material, or other similar luminescent material. Further, in this regard, experience has shown that the life expectancy of the radiance from the luminescent material is substantially extended. It is believed that the reflective material, overlying the luminescent material, serves to protect the chemical content of the luminescent material such that the decay of its luminous glow is substantially reduced.

As an added benefit, the first layer 22 may be available in a wide assortment of colors including white, yellow, orange, blue, and red, for rendering further enhanced visibility to an underlying structure.

Figure 2:
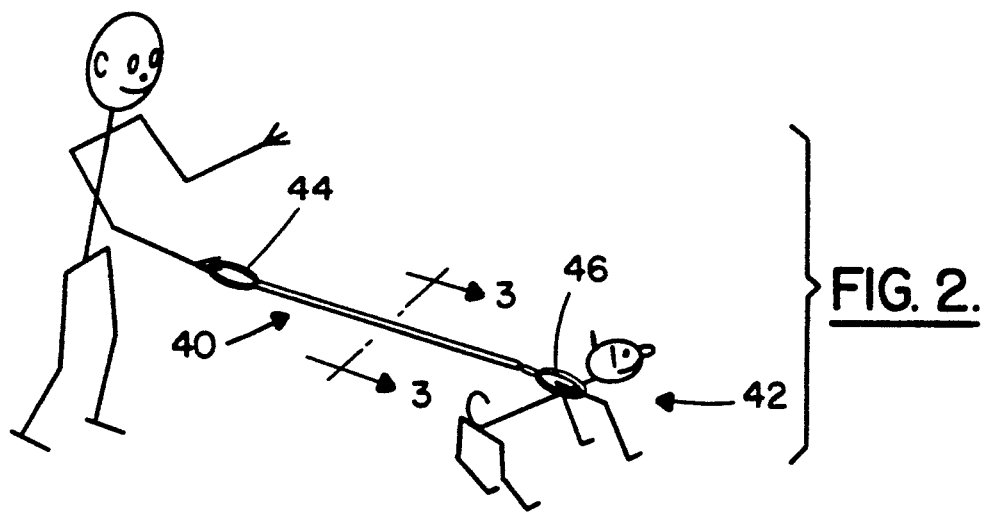
FIG. 2 is a pictorial view depicting one embodiment of the invention.
Figure 3:
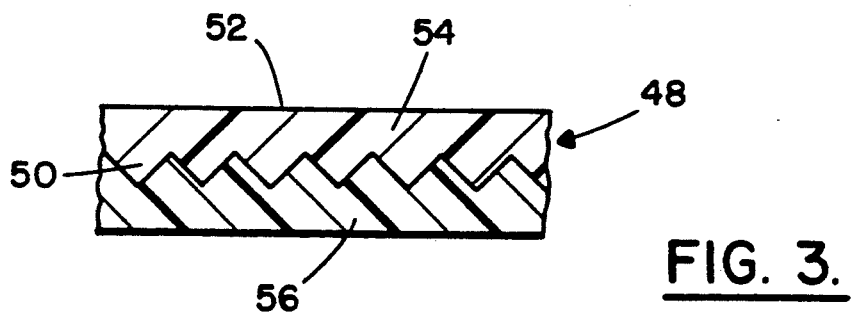
FIG. 3 is a cross section view taken generally along line 3—3 in FIG. 2.

Another embodiment of the invention is illustrated in FIGS. 2 and 3. In this embodiment, a visibility enhanced leash 40 is depicted for controlling and constraining a pet animal, such as a dog 42. The leash 40 is of flexible elongated construction that extends between a handle member 44 at its proximal end adapted to be gripped by the dog's human companion and an attachment member 46 of suitable construction for releasably connecting the leash to a collar or harness for the dog.

In cross section, as seen in FIG. 3, the construction of the leash is similar to that of the material 20. Specifically, it includes a first layer 48 of the prismatic light reflective material, similar to layer 22, formed with a plurality of minute prism-like formations 50 projecting therefrom at regular spaced intervals. The first layer 48 includes an overlying substantially smooth light transmissive surface 52 and a main body 54 intermediate the formations 50 and the surface 52. Bonded to the prism-like formations 50 so as to be contiguously and integrally attached to their underlying surface and generally coextensive therewith is a second layer 56 of luminescent material.

In this embodiment, the leash 40 acts both as a strength member for controlling and restraining a pet animal and also incorporates the enhanced visibility characteristics of the material 20 as previously described.

Figure 4:
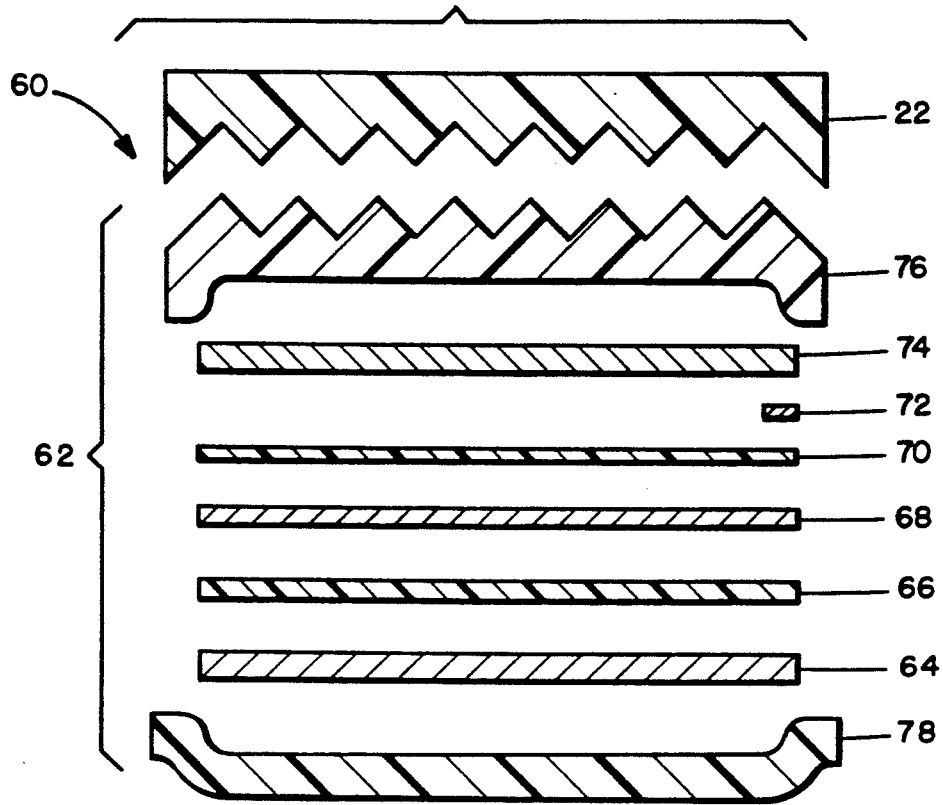
FIG. 4 is a cross section view of another embodiment of the flexible visibility enhancing material.
Figure 5:
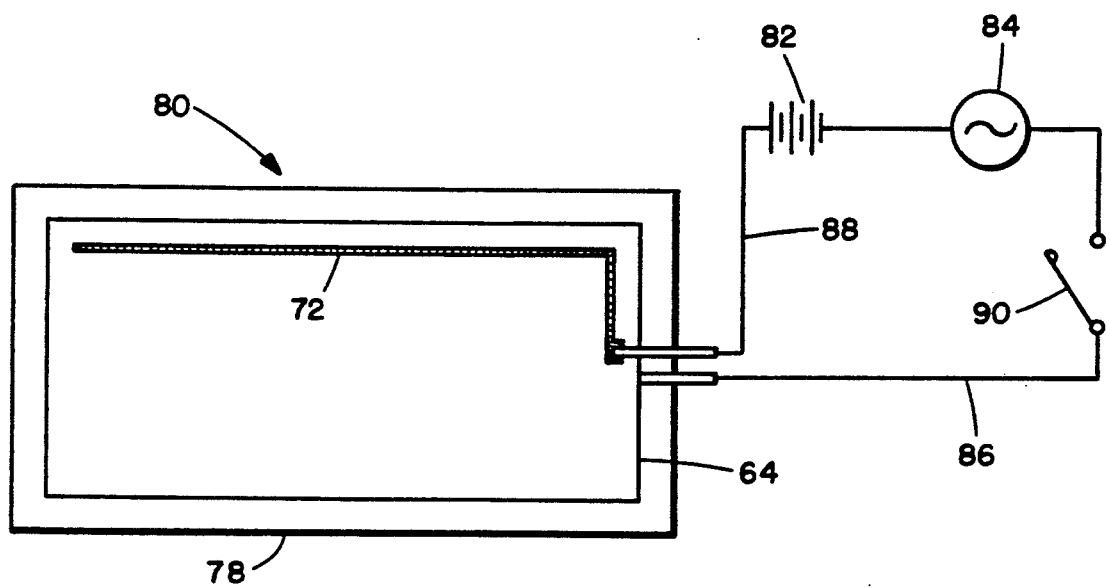
FIG. 5 is a schematic diagram of an electrical circuit for operating the embodiment depicted in FIG. 4.

Yet another embodiment of the invention is illustrated in FIGS. 4 and 5 which comprises modified flexible material 60 of the type according to which the luminescent material can be selectively energized to become luminescent. In this embodiment, the second layer 34 of luminescent material depicted in FIG. 1 has been replaced by a composite layered system 62 comprised of a plurality of sublayers which are bonded together in a suitable manner and encapsulated so as to be substantially hermetically sealed.

As seen in FIG. 4, a first electrode 64, typically of aluminum foil, has bonded thereto, first a plastic dielectric layer 66, then a phosphor layer 68 comprised in substantial part of zinc sulfide. The layers 66 and 68 may be screened onto the aluminum foil layer in a well known manner. Overlying the phosphor layer 68 is a transparent electrode 70 of suitable plastic such as a polyester film on an opposite surface of which is suitably deposited a second electrode 72 which may be in the form of a silver bus bar. A final layer 74 may be a suitable desiccant to eliminate moisture from the system 62.

Overlying and underlying the electrodes 64, 72 and their associated layered components are upper and lower caps 76, 78, respectively, which are peripherally bonded, as by heat sealing, to encapsulate all of the components and maintain them hermetically sealed. The caps 76, 78 may be composed of a polyester or other suitable plastic material. One material which has been found to be particularly desirable for the purpose is the copolymer polychlorotrifluoroethylene and polyvinylidene fluoride, one source of which is Allied Chemical Corporation of Morristown. NJ which sells the material under the trademark "ACLAR".

Therefore, the composite layered system 62 is suitably bonded to the prismatic layer 22 in a manner similar to the bonding of the layer 34 to the layer 22 of the FIG. 1 embodiment.

Schematic electrical circuitry 80 is illustrated in FIG. 5 for operating the composite layered system 62. To this end, a battery 82 is provided as a source of d.c. voltage, or electromotive force. Electrically coupled to the battery is a suitable inverter 84 which converts the d.c. output of the battery to a.c. Leads 86, 88 of copper or other suitable material connect, respectively, to the electrodes 64, 72. A switch 90 can be manually or automatically operated, in some desired fashion, to thereby cause to be generated an electrical field across the phosphor layer 68 with the result that the phosphor layer 68 thereby becomes luminescent.

As in the instance of the material 20, the life expectancy of the radiance from the composite layered system 62 is substantially extended when combined with the microprism material 22. This desirable and unobvious result is achieved because, with the construction disclosed, it is not necessary to electrically energize the phosphor layer 68 as frequently to obtain a desired energy output when the composite layered system 62 is employed with the electrical circuitry 80 as compared with the use of that system but without the prismatic layer 22.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Flexible visibility enhancing material comprising
   a first layer of prismatic light reflective material having an underlying surface formed with a plurality of minute prismlike formations projecting therefrom at regular spaced intervals and an overlying substantially smooth light transmissive surface:
   a second layer of luminescent material continguously and integrally attached to said underlying surface of prism-like formations and generally coextensive therewith, said second layer of luminescent material including phosphorescent material which becomes luminous when electrically excited: and
   exciting means for selectively creating an electric field in the region of said phosphorescent material to cause said luminescent material to become luminous:
   whereby said visibility enhancing material simultaneously rediates luminescent light from said second layer through said underlying surface of prism-like formations and through said smooth light transmissive surface and the reflected light from said prism-like formations through said smooth light transmissive surface of said first layer.

2. Flexible visibility enhancing material as set forth in claim 1 including:
   a layer of pressure sensitive adhesive material adherent to a surface of said second layer opposite said first layer.

3. Flexible visibility enhancing material as set forth in claim 2 including:
   a sheet of backing material protectively adhered to said layer of adhesive material and selectively removable therefrom to enable said visibility enhancing material to be attached to a supporting structure.

4. Flexible visibility enhancing material as set forth in claim 1
   wherein said first and second layers are composed of vinyl.

5. Flexible visibility enhancing material as set forth in claim 4
   wherein said second layer is bonded to said first layer by heat sealing.

6. Flexible visibility enhancing material as set forth in claim 1
   wherein said first and second layers are in sheet form.

7. A visibility enhanced leash for controlling and restraining a pet animal comprising:
   a flexible elongate member extending between proximal and distal ends including handle means at said proximal end and attachment means at said distal end for releasably connecting said elongate member to the pet animal, said elongate member including:
   a first layer of prismatic light reflective material having an underlying surface formed with a plurality of minute prismlike formations projecting therefrom at regular spaced intervals and an overlying substantially smooth light transmissive surface:

a second layer of luminescent material contiguously and integrally attached to said underlying surface of prism-like formations and generally coextensive therewith, said second layer of luminescent material including phosphorescent material which becomes luminous when electrically excited; and exciting means for selectively creating an electric field in the region of said phosphorescent material to cause said luminescent material to become luminous:

whereby said leash simultaneously radiates luminescent light from said second layer through said underlying surface of prismlike formations and through said smooth light transmissive surface and reflected light from said prism-like formations through said smooth light transmissive surface of said first layer.

8. A visibility enhanced leash as set forth in claim 7 wherein said first and second layers are composed of vinyl.

9. A visibility enhanced leash as set forth in claim 8 wherein said first and second layers are bonded together by heat sealing.

10. A method of making flexible visibility enhancing material comprising of steps of:

providing a first layer of prismatic light reflective material having an underlying surface formed with a plurality of minute prism-like formations projecting therefrom at regular spaced intervals and an overlying substantially smooth light transmissive surface:

contiguously and integrally attaching to said underlying surface of prism-like formations and generally coextensive therewith a second layer of luminescent material including phosphorescent material which becomes luminous when electrically excited:

applying first and second electrodes adjacent opposite surfaces, respectively, of the phosphorescent material; and providing means for selectively energizing the first and second electrodes thereby creating an electric field for exciting the phosphorescent material;

whereby the visibility enhancing material enables simultaneous radiation of luminescent light from the second layer through the underlying surface of prism-like formations and through the smooth light transmissive surface and of reflected light from the prism-like formations through the smooth light transmissive surface of the first layer.

11. A method as set forth in claim 10 including the step of applying a layer of pressure sensitive adhesive material adherent to a surface of the second layer opposite the first layer.

12. A method as set forth in claim 11 including the step applying a sheet of backing material so as to be protectively adhered to the layer of adhesive material and selectively removable therefrom to enable the visibility enhancing material to be attached to a supporting structure.

13. A method as set forth in claim 11 wherein the first and second layers are composed of vinyl.

14. A method as set forth in claim 11 wherein the first and second layers are in sheet form.

15. A method as set forth in claim 13 wherein the first and second layers are bonded together by heat sealing.

16. Flexible visibility enhancing material as set forth in claim 1
wherein said exciting means includes:
first and second spaced electrodes positioned on opposite sides of said phosphorescent material; and
a source of electromotive force coupled to said first and second electrodes for creating an electric field therebetween.

17. Flexible visibility enhancing material as set forth in claim 16
wherein said source of electromotive force comprises an electrical circuit including a battery, an inverter, and a switch for selectively coupling said battery, said inverter, and said first and second electrodes.

* * * * *